United States Patent Office 3,123,600
Patented Mar. 3, 1964

3,123,600
PREPARATION OF 6α,16α-DIMETHYL-17α-HYDROXYPROGESTERONE
Robert P. Graber, Minneapolis, Minn., and Martin B. Meyers, Belfast, Northern Ireland, assignors to General Mills, Inc., a corporation of Delaware
No Drawing. Filed July 6, 1961, Ser. No. 122,092
13 Claims. (Cl. 260—239.55)

This invention relates to a method of preparation of 6,16-dialkyl-17-oxygenated progesterones and to novel intermediates in the preparation thereof.

The resulting products, the 6,16-dialkyl-17-oxygenated progesterones are members of the steroid class of sex hormones, which includes progesterone.

This class of substances is of clinical value for the prevention of habitual or threatened abortion, the treatment of dysmennorhoea, pre-menstrual tension, as ovulation-suppressing agents and other sex cyclic regulatory purposes. As ovulation-suppressing agents, such compounds find utility for treatment of cows for stock breeding purposes and elimination or reduction of animal population such as dogs, rabbits, mice and rats.

In addition to their usefulness in themselves as highly active progestational hormones, the 6,16-dialkyl-17-oxygenated progesterones are valuable intermediates in the preparation of other steroids. The compounds are of great value for the chemical and/or microbiological conversion to the anti-inflammatory corticoid hormones, for example, by the introduction of oxygen into position 11 of the molecule by fermentation with certain known microorganisms to provide an 11-hydroxy compound in which the 11-hydroxy group may be further oxidized chemically to a ketone group.

The 6,16-dialkyl-17-oxygenated progesterones are accordingly active progestational agents in themselves and further useful as valuable intermediates to research chemists for conversion to other progestogens or to corticoid hormones.

Briefly, the invention provides a method of converting a compound such as a 5α,6α-oxido-16α-alkylpregnan-3β,17α-diol-20-one to the 6α,16α-dialkyl-17α-hydroxyprogesterones. The 5,6-oxido compound may be prepared from known starting materials such as 5α,6α-oxido-16-pregnen-3β-ol-20-one or the 3 acylates thereof or 16-dehydropregnenolone acylate (5,16-pregnadien-3β-ol-20-one 3-acylate) by two different reaction routes. The invention can best be followed by means of the following schematic representation. Reaction Sequence A is the preparation of 5α,6α-oxido-16α-alkylpregnan-3β,17α-diol-20-one from 5α,6α - oxido-16-pregnen-3β-ol-20-one 3-acylate while Reaction Sequence B is the preparation thereof from 16-dehydropregnenolone acylate. Reaction Sequence C shows the subsequent conversion to the 6α,16α-dialkyl-17α-hydroxyprogesterones.

In the following reaction sequence R and R' are alkyl groups having from 1 to 8 carbon atoms and R and R' may be the same or different alkyl groups and the acyl groups may take the form $$R'''\overset{O}{\underset{\|}{C}}-$$

in which R''' is an alkyl, cycloalkyl, aralkyl or alkoxyaralkyl group, the alkyl group generally having from 1 to 12 carbon atoms and the aryl group generally being phenyl. Illustrative of such ester groups are the acetate, caproate, cyclopentyl propionates, phenyl propionate, p-propoxyphenyl propionate, p-hexoxyphenyl propionate and p-dodecoxyphenyl propionate. Since the activity of the compound generally varies, dependent on the acylate group in the 17 position, the acylate group in this position may be varied widely to provide the activity desired. As the particular acylate groups in the 3 and 20 positions do not have any bearing on the activity, the acylate groups in these positions will generally be those in which R''' is an alkyl group having from 1 to 12 carbon atoms and as a practical matter the acetate ester is generally employed.

REACTION SEQUENCE A

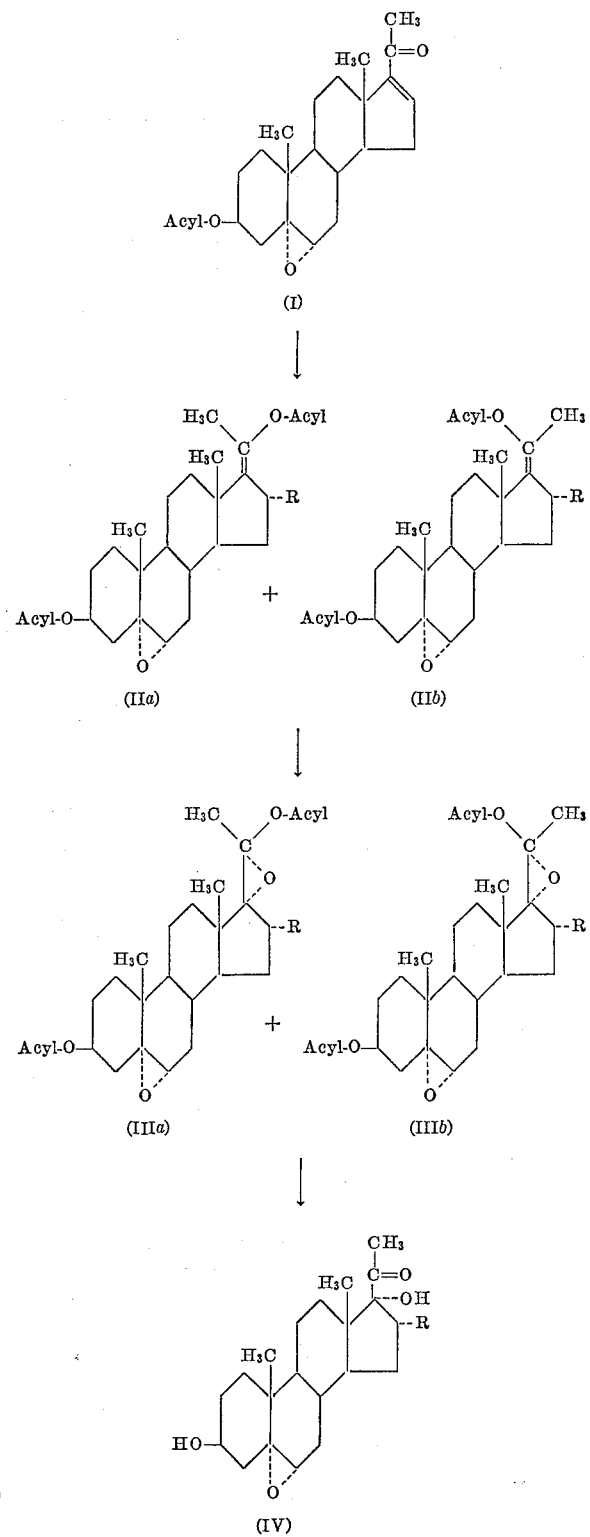

REACTION SEQUENCE B
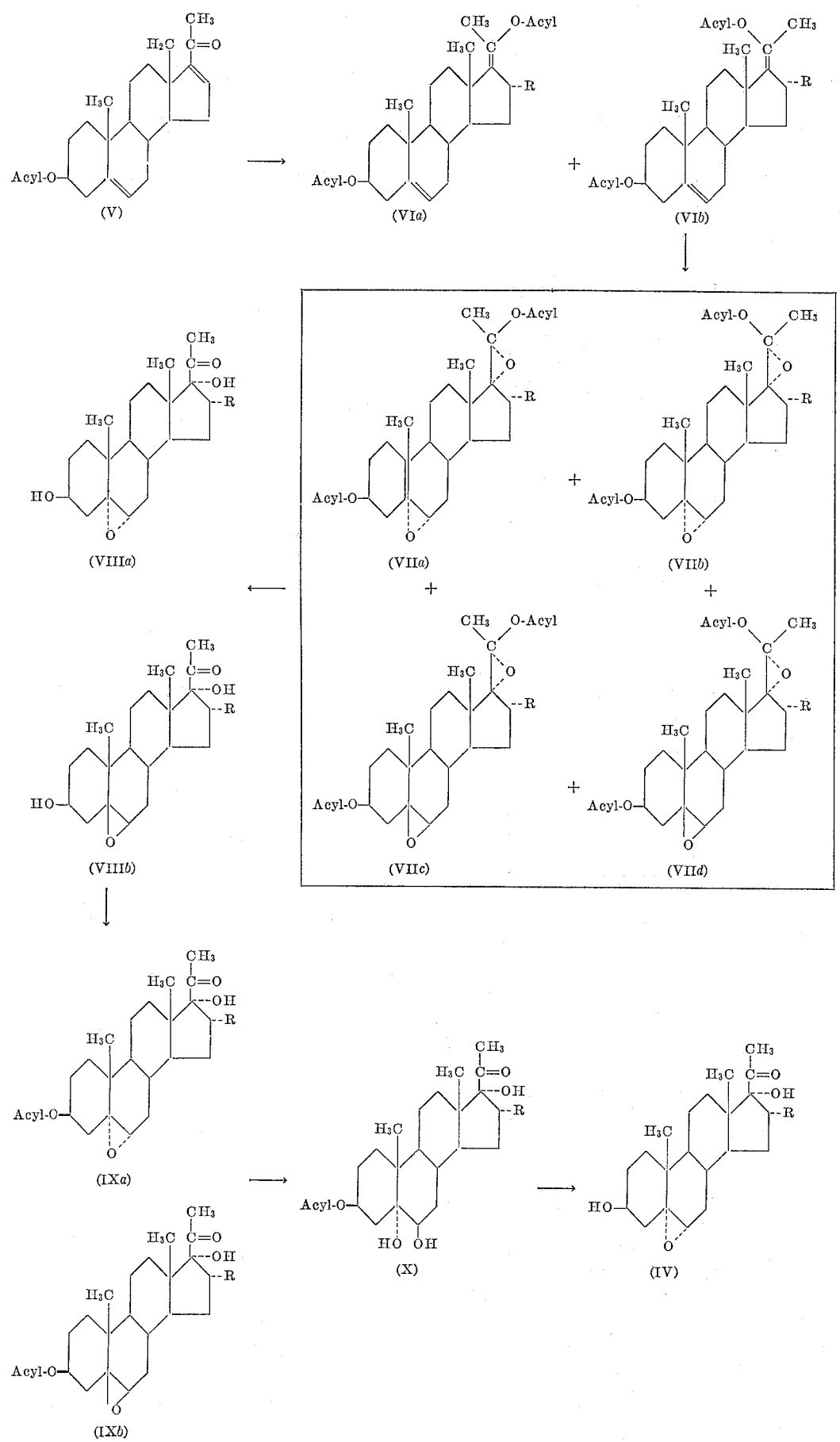

REACTION SEQUENCE C

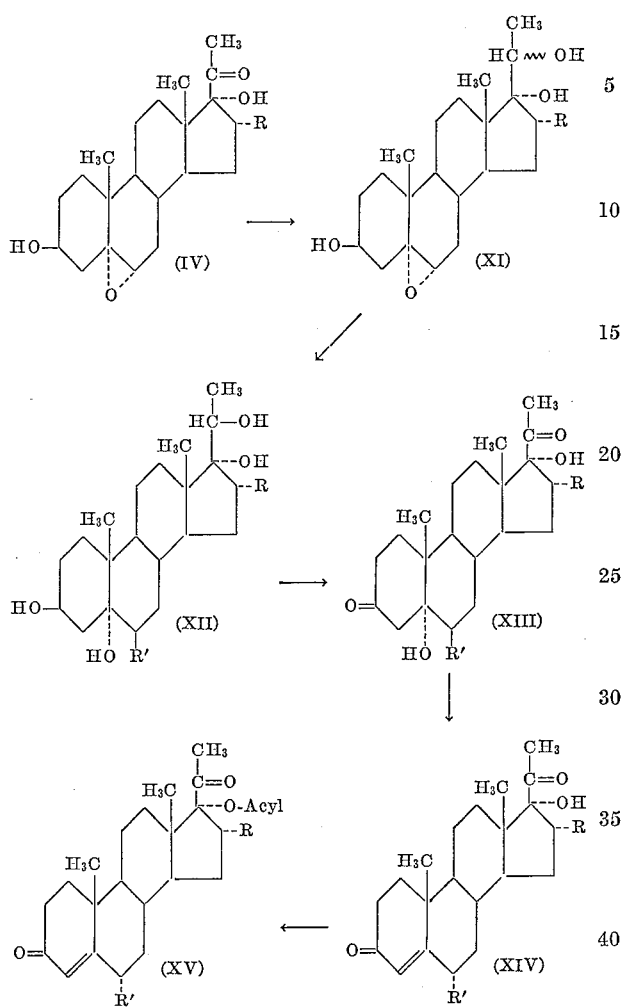

Briefly, the synthetic sequence A described above leads from 5α, 6α-oxido-16-pregnen-3β-ol-20-one 3-acylate (I) via Grignard alkylation at carbon 16 and in situ enol acylation to the 5α,6α-oxido-16α-alkyl-17(20)-pregnen-3α,20-diol diacylates (IIa and IIb), thence by epoxidation to the oxides (IIIa and IIIb) followed by alkaline hydrolysis to 5α,6α-oxido-16α-alkylpregnan-3β,17α-diol-20-one (IV).

The synthetic sequence B leading to the oxido-diolone (IV) proceeds from 16-dehydropregnenolone acylate (5, 16-pregnadien-3β-ol-20-one acylate) (V), or its 3-alcohol, by way of Grignard alkylation and in situ enol acylation to the 16α-alkyl-15,17(20)-pregnadien-3,20-diol diacylates (VIa and VIb). Epoxidation then gives the mixture of the four 5,6:17α,20-dioxido 3,20-diacylates (VIIa-d). Alkaline hydrolysis produces the 5α,6α- and 5β,6β-oxido-16α-alkylpregnan-3β,17α-diol-20-ones (VIIIa and VIIIb) which are acylated to the corresponding 3β-acylates (IXa and IXb). Acid-catalyzed scission of the 5,6-oxides, either separately or in admixture, affords the tetralone, 16α-alkylpregnan-3β,5α,6β,17α-tetrol-20-one (X), which is converted to 5α,6α-oxido-16α-alkylpregnan-3β,17α-diol-20-one (IV) identical in all respects to material prepared by the sequence A above. This conversion may be accomplished directly as shown or by conversion to the 5α, 6α-oxido-16α-alkylpregnan-3β,17α-diol-20-one 3-acylate followed by hydrolysis to (IV).

Reduction of IV with sodium borohydride affords the 5α,6α-oxido-3β,17α,20-triol (XI) and Grignard opening of the oxide grouping establishes the 6β-alkyl in 6β,16α-dialkylpregnan-3β,5α,17α,20-tetrol (XII). Microbial oxidation with *Flavobacterium dehydrogenans* then gives 6β, 16α-dialkylpregnan-5α,17α-diol-3,20-dione (XIII) which on dehydration and epimerization of the 6β-alkyl group leads to 6α,16α-dialkyl-17α-hydroxyprogesterone (XIV).

It is therefore an object of this invention to provide a novel method of preparation of 6,16-dialkyl-17-oxygenated progesterones.

It is also an object of this invention to provide novel alkylated steroid compound intermediates which may be converted to the progestationally active 6,16-dialkyl-17-oxygenated progesterones.

It is further an object of this invention to provide novel alkylated steroid compounds having the formulae:

(1) The cis and trans forms of

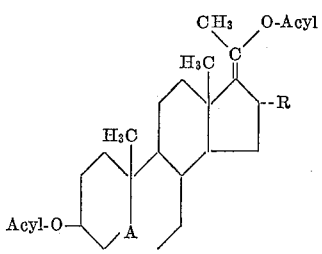

where A is selected from the group consisting of

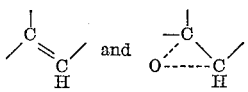

(2) The cis and trans forms of

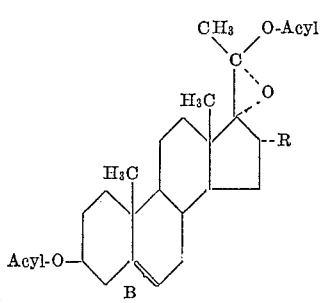

where B is selected from the group consisting of α-oxido and β-oxido groups.

(3)

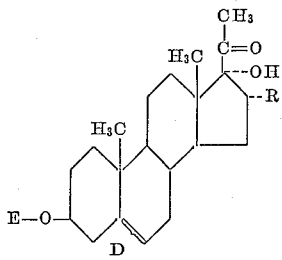

(4)

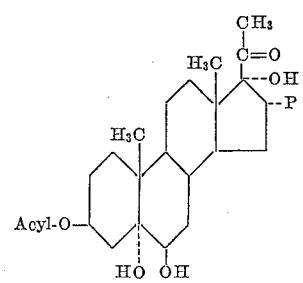

(5) 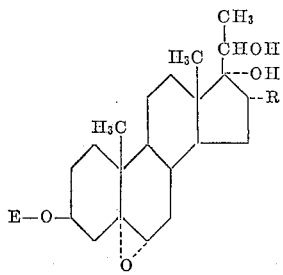

(6) 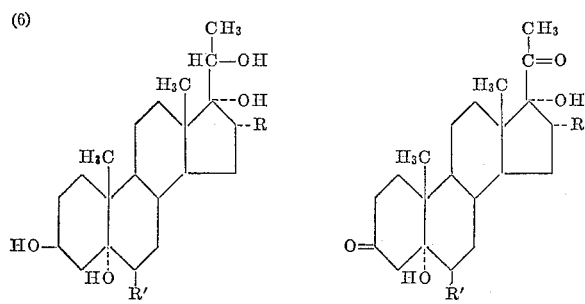

where D is selected from the group consisting of α-oxido and β-oxido groups and E is selected from the group consisting of hydrogen and acyl groups.

For purposes of simplicity of illustration, the process and compounds provided thereby will be discussed in detail below with reference to the methyl compounds and the acetate esters, but it is hereby understood that this is merely illustrative of the process and products of the present invention and is not to be construed as limiting the invention.

The starting material in Reaction Sequence B, represented by Formula V, may be the well-known compound 16-dehydropregnenolone acetate. The starting material in Reaction Sequence A, represented by Formula I, may be prepared from the mixture of α and β isomers prepared by epoxidation of unsaturated steroid compounds with per acids, in this instance, the epoxidation of 16-dehydropregnenolone acetate. The α oriented isomer which usually predominates may then be harvested by conventional crystallization procedures or in accordance with our copending appliciation Serial No. 59,203, filed September 29, 1960. In accordance with the teachings of said copending application, the mixture of α and β epoxides may be converted to the α oxido compound alone by (a) opening the oxirane ring by treatment with perchloric acid in aqueous acetone to produce a single trans diol, (b) regeneration of only the α epoxide by esterification of the secondary hydroxyl group by treatment with methane sulfonyl chloride in pyridine, and (c), elimination of the ester group then formed by treatment with weak alkali such as an aqueous mixture of sodium bicarbonate and pyridine. Strong alkali may also be used, such as sodium, potassium, barium or lithium hydroxide. However, this results in hydrolysis of the 3-ester function thereby requiring reacetylation at the 3 position. From this point on, the following is a detailed description of the various steps of the process from the starting materials 16-dehydropregnenolone acetate and 5α,6α-oxido-16-pregnen-3β-ol-20-one 3-acetate.

(1) Alkylation and enol acylation of 5α,6α-oxido-16-pregnen-3β-ol-20-one acetate (I).

Treatment of the $\Delta^{16}$-dehydro-20-ketone compound, either as the 3-alcohol or 3-ester, with methyl Grignard reagent produces an intermediate 16α-methylated enolic Grignard complex which, without isolation, is treated in situ with an acetylating agent. There is thus produced a mixture of the cis and trans forms of 5α,6α-oxido-16α-methyl-17(20)-pregnen-3β,20-diol 3β, 20-diacetate (IIa and IIb).

The reaction is normally carried out with about 2.4 moles of methyl magnesium bromide per mole of $\Delta^{16}$-dehydro-20-ketone. As little as 1.4 moles per mole of steroid may be employed. Ratios of greater than 2.4 moles per mole of steroid may be used but no increased beneficial effect is obtained thereby. Other alkyl magnesium bromides may be employed to give other 16α-alkylated compounds. Alkyl magnesium iodides and dialkyl magnesium compounds may also be used. The 1,4-addition of the Grignard reagent to the α,β-unsaturated ketone system is catalyzed by the addition of cuprous chloride. Normally the salt is added in a ratio of about 0.1 mole per mole of steroid; somewhat lesser ratios are substantially as effective, but larger ratios show no increased beneficial effect. Other cuprous halides may also be employed such as cuprous bromide or cuprous iodide. The solvent normally used is tetrahydrofuran. However, mixtures of ether and tetrahydrofuran or dioxane and tetrahydrofuran may also be employed but the results are less satisfactory.

The reaction is normally carried out under an inert atmosphere such as nitrogen gas for a period of about 45 minutes at about 25° C. Lower temperatures may be used but then longer reaction times are required. Somewhat higher temperatures and shorter times may also be employed but in these cases some attack of Grignard reagent on the 3-ester function and the 5α,6α-oxide may be observed.

After the termination of the Grignard alkylation period, the intermediate Grignard complex is acylated at about 25° C. by addition of an acylating agent. The acylating agents normally employed are acetyl chloride or acetic anhydride, usually diluted with a solvent such as tetrahydrofuran. Other acylating agents may be used such as propionyl chloride, propionic anhydride and the like. After the acylating agent has been introduced, the mixture is allowed to stir for a period of about 45 minutes when acid chlorides are used, or somewhat longer when acid anhydrides are used.

The reaction mixture is finally treated with saturated aqueous ammonium chloride solution to decompose the excess Grignard reagent and excess acylating agent. Other ammonium salts may be used and even water alone may be used followed by careful acidification with, for example, hydrochloric acid. The solvent layer is diluted with ethyl ether, separated from the aqueous layer, and washed free of inorganic materials. Other water-immiscible solvents may be used such as ethyl acetate, methylene chloride, and the like. After drying, the solvents are removed in vacuo to give the crude alkylated product as a mixture of cis and trans isomeric forms of 5α,6α-oxido-16α-methyl-17(20)-pregnen-3β,20-diol diacetate (IIa and IIb). In practice, since both isomeric forms give the subsequent desired product (IV below), they are used without separation. The presence of the desired functionality is indicated by the characteristic infrared spectrum.

(2) Epoxidation of cis and trans 5α,6α - oxido - 16α-methyl-17(20)-pregnen-3β,20-diol 3,20-diacetate (IIa and IIb).

The oxidopregnendiol diacetate mixture is epoxidized by treatment with a peracid to give the corresponding 5α,6α:17α,20-dioxido 3,20-diacetoxy compound as a mixture of isomeric forms. These forms are the cis and trans forms of 5α,6α:17α,20-dioxido-16α-methyl-pregnan-3β,20-diol 3,20-diacetate (IIIa and IIIb).

The reaction is normally carried out by treatment with a small excess of perbenzoic acid in benzene solution at room temperature for about 3-4 hours; about 1.1 moles of peracid per mole of steroid are normally employed. Other peracids may be used such as peracetic acid or monoperphthalic acid; when peracetic acid is used, the solvent is normally chloroform. The time of the reaction will depend on the peracid used, shorter times with peracetic acid and longer times with monoperphthalic acid being required.

At the end of the reaction with perbenzoic acid, the solution is treated with an aqueous solution of potassium iodide, sodium thiosulfate and sodium bicarbonate. The solvent layer is finally washed thoroughly with aqueous sodium bicarbonate solution and water. After drying, the solvents are removed in vacuo to give the crude mixture of cis and trans dioxido compounds (IIIa and IIIb). At the end of the reaction when peracetic acid is used the mixture is diluted with, for example, methylene chloride, the solvent layer separated and washed thoroughly with aqueous sodium bicarbonate and water. Evaporation again gives the mixture of cis and trans dioxides. The mixture is normally used without separation since both isomers give the subsequent desired product (IV below). The presence of the desired functional groups is indicated by the characteristic infrared spectrum.

(3) Alkaline hydrolysis of the $5\alpha,6\alpha:17\alpha,20$-dioxido-$16\alpha$-methylpregnan-$3\beta,20$-diol diacetates (IIIa and IIIb).

Hydrolysis of the 3- and 20-acetate groupings to give $5\alpha,6\alpha$-oxido-$16\alpha$-methylpregnan-$3\beta,17\alpha$-diol-20-one (IV) is carried out under alkaline conditions. Under these conditions, the ester functions at 3 and 20 are removed. The intermediate $17\alpha,20$-oxido-20-alcohol thus produced is unstable under the hydrolysis conditions and spontaneously rearranges in situ to the $17\alpha$-hydroxy-20-ketone system.

This alkaline hydrolysis-rearrangement is normally carried out by treatment with methanolic potassium hydroxide at the reflux temperature of the mixture for about 45 minutes. Other alkalis and solvent mixtures may be used, however, for example, sodium hydroxide in aqueous methanol or ethanol. With the stronger bases, the reaction time at the reflux temperature is shorter, with the weaker carbonate bases, the reflux period is longer. Also, with the stronger bases, the reaction may be carried out at room temperature but substantially longer times are required.

The product is normally isolated by neutralization with acetic acid, evaporation in vacuo to remove most of the alcohol solvent, and then extraction of the steroidal material with ethyl acetate or other suitable water-immiscible solvents such as chloroform, methylene chloride and the like. For acidification, other water soluble organic acids may be employed and even mineral acids such as hydrochloric acid providing no excess is introduced.

The solvent extracts are washed free of acids and inorganic materials and the solvents removed in vacuo to give the $5\alpha,6\alpha$-oxido-$16\alpha$-methylpregnan-$3\beta,17\alpha$-diol-20-one (IV) which may be purified by crystallization in the conventional manner.

(4) Alkylation and enol acylation of 5,16-pregnadien-$3\beta$-ol-20-one acetate (V).

Treatment of the above $\Delta^{16}$-dehydro-20-ketone compound with methyl Grignard reagent produces an intermediate $16\alpha$-methylated enolic Grignard complex which, without isolation, is treated in situ with an acetylating agent. There is thus produced a mixture of the cis and trans forms of $16\alpha$-methyl-5,17(20)-pregnadien-$3\beta,20$-diol diacetate (VIa and VIb).

The conditions for the preparation of this cis-trans mixture are the same as for the preparation of IIa and IIb described in section 1 above. The mixture is normally used without separation since both isomers give the subsequent desired product (X below). The presence of the desired functional groups is indicated by the characteristic infrared spectrum.

(5) Epoxidation of cis and trans $16\alpha$-methyl-5,17(20)-pregnadien-$3\beta,20$-diol diacetate (VIa and VIb).

The pregnadiendiol diacetate mixture is epoxidized by treatment with an excess of peracid to give the corresponding 5,6:$17\alpha,20$-dioxido-3,20-diacetoxy compound as a mixture of four isomeric forms (VIIa, VIIb, VIIc, and VIId). These forms are the cis and trans $17\alpha,20$-oxides corresponding to VIa and VIb each of which is also present as its $5\alpha,6\alpha$- and $5\beta,6\beta$-oxide.

The reaction is normally carried out by treatment with a small excess of perbenzoic acid in benzene solution at room temperature for about 5–6 hours; usually about 2.2 to 2.4 moles of peracid are used per mole of steroid. Other peracids may be used such as peracetic acid or monoperphthalic acid. The exact reaction conditions will vary with the peracid used as described in the epoxidation of IIa and IIb above, see section 2.

The reaction is worked up as described in section 2 above to give the cis and trans $5\alpha,6\alpha$- and $5\beta,6\beta$-dioxido compounds VIIa, VIIb, VIIc and VIId. The mixture is normally used without separation since all four isomers give the subsequent desired product X. The presence of the desired functional groups is indicated by the characteristic infrared spectrum.

(6) Alkaline hydrolysis of the 5,6:$17\alpha,20$-dioxido-$16\alpha$-methylpregnan-$3\beta,20$-diol 3,20-diacetates (VIIa, VIIb, VIIc and VIId).

Alkaline hydrolysis of the 3- and 20-acetate groupings produces a mixture of $5\alpha,6\alpha$-oxido-$16\alpha$-methylpregnan-$3\beta,17\alpha$-diol-20-one (VIIIa) and $5\beta,6\beta$-oxido-$16\alpha$-methylpregnan-$3\beta,17\alpha$-diol-20-one (VIIIb). The intermediate $17\alpha,20$-oxido-20-alcohol formed by hydrolysis of the 20-ester function is unstable under the hydrolysis conditions and spontaneously rearranges in situ to the $17\alpha$-hydroxy-20-ketone system.

The alkaline hydrolysis-rearrangement is normally carried out by treatment with methanolic potassium hydroxide at the reflux temperature of the mixture for a period of about one hour. Other alkalis and solvent mixtures may be employed as described in section 3 above.

The reaction mixture is worked up as described in section 3 above to give $5\alpha,6\alpha$- and $5\beta,6\beta$-oxido-$16\alpha$-methylpregnan-$3\beta,17\alpha$-diol-20-one (VIIIa and VIIIb). These isomeric oxides may be separated by fractional crystallization or chromatography on alumina. In practice, however, since both oxides give the subsequent desired product X, the mixture of isomers is used without separation. The presence of the desired functional groups is indicated by the characteristic infrared spectrum.

(7) Acylation of $5\alpha,6\alpha$-oxido-$16\alpha$-methylpregnan-$3\beta,17\alpha$-diol-20-one and its $5\beta,6\beta$-isomer (VIIIa and VIIIb).

The isomeric oxide mixture is acetylated in the usual fashion to produce the corresponding mixture of $5\alpha,6\alpha$- and $5\beta,6\beta$-oxido-$16\alpha$-methylpregnan-$3\beta,17\alpha$-diol-20-one 3-acetates (IXa and IXb).

The reaction is normally carried out by treatment of a pyridine solution with acetic anhydride at room temperature for 16–24 hours. These conditions effect selective acetylation of the secondary $3\beta$-hydroxyl group without acetylating the much less reactive tertiary $17\alpha$-hydroxyl group. The acetylation may also be carried out at somewhat higher temperatures for shorter periods of time. Even acetic anhydride alone may be used but then longer times and/or higher temperatures are required, for example, in refluxing acetic anhydride. Other acylating agents may also be employed, for example, propionic or butyric anhydride to form the corresponding esters. Other water soluble aromatic heterocyclic bases such as $\alpha,\beta$, or $\gamma$-picoline may also be employed in place of pyridine.

The reaction mixture is normally worked up by careful dilution with water. The product normally is precipitated as a crystalline solid which is removed by filtration, washed thoroughly with water and methanol and then dried. Alternatively, the precipitated product may be extracted with, for example, ethyl acetate, methylene chloride, chloroform or the like. The extracts are washed free of acidic and basic materials and evaporated to dryness. The mixture of $5\alpha,6\alpha$- and $5\beta,6\beta$-oxido-$16\alpha$-methylpregnan-$3\beta$-ol-20-one 3-acetates (IXa and IXb) may be separated by fractional crystallization or by chromatography. In practice, since both oxide acetates give the subsequent desired product X, the mixture is used without separation.

(8) Acid-catalyzed hydrolysis of 5α,6α- and 5β,6β-oxido - 16α - methylpregnan-3β,17α-diol-20-one 3-acetate (IXa and IXb).

Treatment of the 5α,6α-oxide and the 5β,6β-oxide, either separately or together as in the mixture produced above, with water in the presence of a strong acid catalyst effects hydrolytic scission of the oxide ring to give the single trans diaxial 5,6-diol, 16α-methylpregnan-3β,5α,6β,17α-tetrol-20-one 3-acetate (X).

The reaction is normally carried out in aqueous acetone solution with perchloric acid acting as the strong acid catalyst. The composition of the aqueous acetone solvent medium is usually in the range of one to four parts of acetone to one part of water. The ratio of solvent mixture to steroid as well as the ratio of acetone to water will depend upon the solubility characteristics of the particular steroid 5,6-oxide to be hydrolyzed. The normality of the perchloric acid is usually about 0.2 N but may vary from 0.1 to 1.0 N. Even lower concentrations than 0.1 N or higher concentrations than 1.0 N may be used. The reaction rate depends on the acid concentration, being lower with the lower concentrations and vice versa.

Other solvent mixtures may also be employed, for example, water-tetrahydrofuran, water-dioxane, etc. Other strong acids may also be used, for example, sulfuric acid and periodic acid.

The time required for the completion of the reaction in a 4:1 acetone-water mixture which is 0.2 N with respect to perchloric acid at room temperature is about one-half hour. This time will vary with concentration of steroid, acid concentration, acid strength, and temperature, being in direct proportion to each of these variables.

After the hydrolytic reaction is complete, the product X is normally isolated by dilution with water. The product separates as a crystalline solid which may be removed by filtration or alternatively extracted with the usual solvents such as ethyl acetate, methylene chloride and the like.

Both the 5α,6α- and 5β,6β-oxide groupings afford the same trans axial diol system by the well known mechanism of trans diaxial opening of 1,2-oxides. The conditions described above do not effect hydrolysis of the acetate ester grouping. There is thus produced 16α-methylpregnan-3β,5α,6β,17α-tetrol-20-one 3-monoacetate (X), which may be purified by crystallization in the conventional manner.

(9) Reclosure of the trans diol system of 16α-methylpregnan-3β,5α,6β,17α-tetrol-20-one 3-acetate (X) to the corresponding 5α,6α-oxide (IV).

The 5α,6β-trans diol system of compound X is converted to the corresponding 5α,6α-oxide (IV) by a two step process. The tetrol 3-monoacetate is treated with methanesulfonyl chloride in pyridine solution to form the methanesulfonate ester of the 6β-hydroxyl group. This methanesulfonate ester, without isolation, is treated with alkali which effects ring closure to the 5α,6α-oxide grouping.

The tetrol monoacetate (X) is normally treated with a small excess of methanesulfonyl chloride, usually 3–5 moles per mole of steroid, in pyridine solution at about 0° C. for 16–24 hours. Other alkylsulfonyl chlorides may also be employed as well as other water-soluble bases such as α, β, or γ-picoline. Somewhat lower temperatures at longer times are also successful, but higher temperatures are less satisfactory.

The methanesulfonate ester may be isolated by careful workup at ice temperature but is an unstable compound. Therefore, the total reaction mixture containing the methanesulfonate ester is normally treated with aqueous alkali. Normally, the reaction mixture is added to an aqueous solution of sodium hydroxide and this mixture heated under reflux for about 30 minutes. The alkali effects closure of the 5α-hydroxy-6β-methanesulfonoxy system to the 5α,6α-oxide grouping together with simultaneous hydrolysis of the 3-ester function. Other alkalis may also be employed such as potassium hydroxide, barium hydroxide, lithium hydroxide and the like. Weaker alkalis may also be employed to effect closure to the α-oxide. For example, sodium or potassium bicarbonate may be used. In these cases, the 3-ester function remains intact.

The product is normally isolated by neutralizing the excess alkali with, for example, acetic acid followed by dilution with water. The product normally crystallizes and is isolated by filtration. Alternatively, the product may be extracted with the usual solvents such as ethyl acetate or methylene chloride. There is thus produced 5α,6α-oxido-16α-methylpregnan-3β,17α-diol-20-one (IV) which may be purified by crystallization in the usual manner. The material so produced is identical in all respects to that prepared as described in section 3 above.

(10) Reduction of 5α,6α-oxido-16α-methylpregnan-3β,17α-diol-20-one (IV).

The 20-ketone function of the oxidodiolone (IV) is reduced to the corresponding alcohol by the action of a borohydride reducing agent to give 5α,6α-oxido-16α-methylpregnan-3β,17α,20-triol (XI).

The reduction is normally carried out with sodium borohydride in aqueous tetrahydrofuran solution under reflux for periods of about one-half to one hour. The ratio of water to tetrahydrofuran is normally about 3:1, but other ratios may also be employed. In addition, other aqueous solvent systems may be used such as aqueous dioxane. The sodium borohydride is normally employed in a ratio of about 1–2 moles per mole of steroid. Other borohydrides may also be used such as potassium borohydride.

The reaction is normally worked up by dilution with saturated sodium chloride solution, separation of the solvent layer which is then washed several times with saturated salt solution, dried and evaporated to dryness in vacuo. There is thus produced the crude 5α,6α-oxido-16α-methylpregnan-3β,17α,20-triol (XI) as a mixture of the 20α-epimer (XIa) and the 20β-epimer (XIb) in which the 20β-epimer predominates. This isomer may be separated from the 20α-epimer by fractional crystallization.

(11) Grignard alkylation of 5α,6α-oxido-16α-methylpregnan-3β,17α,20β-triol (XIb).

The introduction of a methyl group at carbon atom 6 is effected by treatment of the 5α,6α-oxido compound with methyl Grignard reagent to produce 6β,16α-dimethylpregnan-3β,5α,17α,20β-tetrol (XII).

The reaction is normally carried out by treating a tetrahydrofuran solution of the 5α,6α-oxido compound with an excess of 3 molar ethereal methyl magnesium bromide. Toluene is then added, the reaction mixture distilled to remove the ether, and the resulting mixture heated under reflux for about two to two and one-half hours. Other solvent mixtures may also be employed such as tetrahydrofuran-benzene, dioxane-benzene and the like. Other alkyl magnesium bromides may be employed to give other 6-alkylated compounds. Also, alkyl magnesium iodides and dialkyl magnesium compounds may be used.

The reaction is worked up by the addition of saturated aqueous ammonium chloride solution. Other ammonium salts may be used and even water alone may be used followed by dilution with, for example, hydrochloric acid. The solvent layer is separated, washed thoroughly to remove inorganic materials. Evaporation in vacuo then gives the desired dimethyl-tetrol (XII) which can be purified by crystallization in the usual manner.

(12) Oxidation of 6β,16α-dimethylpregnan-3β,5α,17α,20β-tetrol (XII) with *Flavobacterium dehydrogenans*.

Fermentation of the tetrol (XII) with *F. dehydrogenans* var. *hydrolyticum*, ATCC 13930, effects dehydrogenation of the secondary alcohol functions at the 3- and 20-positions to produce 6β,16α-dimethylpregnan-5α,17α-diol-3,20-dione (XIII).

The fermentation is carried out in a basal medium consisting of yeast extract and phosphate. The inoculated medium is incubated for 72 hours at 70–80° F. with shaking and under constant illumination. The tetrol is then introduced in 95% ethanol and the cultures incubated further for 3–7 days at 70–80° F. with continued shaking and illumination.

The cultures are extracted thoroughly with ethyl acetate, the extracts washed with water and saturated salt solution and evaporated to dryness to give a mixture of the starting tetrol and 6β,16α-dimethylpregnan-5α,17α-diol-3,20-dione (XIII). The diol-dione may be separated by chromatography on paper, Florisil or alumina. In practice, however, the material is normally partially purified by crystallization from carbon tetrachloride to eliminate non-steroidal fermentation by-products and then used directly in the next step. The presence of the desired product is shown by its characteristic infrared spectrum.

(13) Dehydration and epimerization of 6β,16α-dimethylpregnan-5α,17α-diol-3,20-dione (XIII).

The diol-dione (XIII) on treatment with hydrochloric acid in ethanol is converted to 6α,16α-dimethyl-17α-hydroxyprogesterone (XIV). The acid conditions effect elimination of the 5α-hydroxyl group to introduce the double bond between carbon atoms 4 and 5. The same acid conditions effect epimerization of the axial 6β-methyl group to the more stable equatorial 6α-methyl group.

The dehydration (β-elimination) and epimerization are normally carried out in absolute ethanol containing a catalytic amount of concentrated aqueous hydrochloric acid under reflux for one-half hour. Other alcoholic solvents may be employed also, for example, methanol and isopropanol. Other acid catalysts may be used such as hydrobromic acid, sulfuric acid, 2,4-dinitrobenzenesulfonic acid, and the like.

The exact times of reflux will depend on the acid strength of the particular acid used and on the boiling point of the alcoholic solvent. Even alkaline β-elimination conditions may be used, for example, dilute sodium hydroxide in ethanol. When an alkali is used, however, the conditions must be such as to avoid homoannulation of the D-ring with its attached 17α-hydroxy-20-ketone system.

The product is recovered by concentration of the acidic ethanol solution to a small volume in vacuo at room temperature. The residual mixture is diluted with water and extracted with the usual solvents, e.g. ethyl acetate. The extracts are washed free of acids, dried and concentrated to dryness in vacuo. The 6α,16α-dimethyl-17α-hydroxyprogesterone is then easily separated by column chromatography, e.g. on neutral alumina.

The 6α,16α-dimethyl-17α-hydroxyprogesterone may be converted to its 17-esters, its Δ¹-dehydro and Δ¹,⁶-bisdehydro derivatives and their esters as disclosed in our co-pending application, Serial No. 88,030, filed February 9, 1961.

The invention can be further illustrated by means of the following examples which are intended as illustrative of the process and products of the present invention and are not to be construed as limiting the invention.

EXAMPLE 1

*Alkylation and Enol Acylation of 5α,6α-Oxido-16-Pregnen-3β-ol-20-one Acetate (I)*

A mixture of 150 ml. of dry tetrahydrofuran and 20 ml. of 3 M ethereal methyl magnesium bromide solution was placed under nitrogen. After 90 ml. of the mixture had been removed by distillation, the remaining mixture was cooled to room temperature and 0.45 g. of powdered cuprous chloride added. With stirring, a solution of 11.20 g. of 5α,6α-oxido-16-pregnen-3β-ol-20-one acetate in 80 ml. of tetrahydrofuran was added over a five-minute period. The mixture was allowed to stir at room temperature for 45 minutes and then a solution of 4 ml. of acetyl chloride in 40 ml. of tetrahydrofuran was quickly added and stirring continued for 40 minutes. Ninety ml. of saturated aqueous ammonium chloride was then added, followed by 100 ml. of ether. The organic layer was separated, washed with 5% aqueous sodium bicarbonate followed by saturated salt solution, dried and evaporated in vacuo to an oil, 13.7 g., which slowly crystallized. The product was a mixture of the cis and trans 5α,6α-oxido-16α-methyl-17(20)-pregnen-3β,20 - diol diacetates (IIa and IIb),

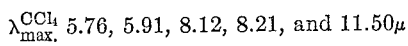
$\lambda_{max.}^{CCl_4}$ 5.76, 5.91, 8.12, 8.21, and 11.50μ

EXAMPLE 2

*Epoxidation of cis and trans 5α,6α-Oxido-16α-Methyl-17(20)-Pregnen-3β,20-Diol 3,20-Diacetate (IIa and IIb)*

The mixture of enol acetates (IIa and IIb) from Example 1 was treated with 75 ml. of a 0.44 N perbenzoic acid solution in benzene at room temperature. After 190 minutes had elapsed, an aqueous solution of potassium iodide, sodium thio sulfate, and sodium bicarbonate was added. The organic layer was separated, washed with 5% aqueous sodium bicarbonate solution followed by saturated salt solution, dried and evaporated in vacuo to a partially crystalline residue, 13.5 g., which consisted principally of a mixture of cis and trans 5α,6α:17α,20-dioxido-16α-methylpregnan-3β,20-diol diacetate (IIIa and IIIb),

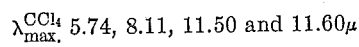
$\lambda_{max.}^{CCl_4}$ 5.74, 8.11, 11.50 and 11.60μ

EXAMPLE 3

*Alkaline Hydrolysis of the 5α,6α:17α,20-Dioxido-16α Methylpregnan-3β,20-Diol Diacetates (IIIa and IIIb)*

The mixture of diepoxides (IIIa and IIIb) from Example 2 was placed in 250 ml. of methanol under nitrogen and a solution of 3 g. of potassium hydroxide in 20 ml. of methanol added. The mixture was heated under reflux for 45 minutes, then cooled and 10 ml. of glacial acetic acid added. The solution was reduced in vacuo to about ⅔ of the original volume and diluted with 750 ml. of water. The resulting precipitate was removed by filtration and washed with water to give 9.6 g. of 5α,6α-oxido-16α-methylpregnan-3β,17α-diol - 20 - one (IV), M.P. 198–2020. Several recrystallizations from aqueous methanol raised the melting point to about 219–225°, $[\alpha]_D^{31}$ —87.1° (Chloroform),

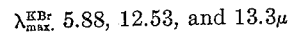
$\lambda_{max.}^{KBr}$ 5.88, 12.53, and 13.3μ

*Analysis.*—Calcd. for $C_{22}H_{34}O_4$: C, 72.89; H, 9.45. Found: C, 72.89; H, 9.63.

EXAMPLE 4

*Alkylation and Enol Acylation of 5,16-Pregnadien-3β-Ol-20-One Acetate (V)*

A mixture of 50 ml. of tetrahydrofuran and 7 ml. of a 3 M solution of methyl magnesium bromide in ether was placed under nitrogen. After 30 ml. of the mixture had been removed by distillation, the remainder was cooled to room temperature and 0.2 g. of powdered cuprous chloride added. With stirring, a solution of 3.58 g. of 5,16-pregnadien-3β-ol-20 - one acetate (16 - dehydropregnenolone acetate) in 25 ml. of tetrahydrofuran was added over a five-minute period. The mixture was allowed to stir for 60 minutes and then a solution of 1.5 ml. of acetyl chloride in 10 ml. of tetrahydrofuran was quickly added. Stirring was continued for 30 minutes and then 30 ml. of saturated ammonium chloride solution was added followed by the addition of 30 ml. of ether. The organic layer was separated, washed with dilute aqueous sodium thiosulfate solution followed by saturated salt solution, dried and evaporated in vacuo to a partially crystalline residue, 4.5 g., which consisted primarily of a mixture of cis and trans 16α-methyl-5,17(20)-pregnadien-3β,20-diol diacetate (VIa and VIb), $\lambda_{max.}^{CCl_4}$ 5.75, 5,78, 5.91, 8.13, 8.20 an 8.46 μd

EXAMPLE 5

*Epoxidation of Cis and Trans 16α-Methyl-5,17(20)-Pregnadien-3β,20-Diol Diacetate (VIa and VIb)*

The mixture of enol acetates (VIa and VIb) from Example 4 was treated with 55 ml. of a 0.44 N solution of perbenzoic acid in benzene at room temperature. At the end of 225 minutes, an aqueous solution of potassium carbonate, potassium iodide and sodium thiosulfate was added. The organic layer was separated and washed with saturated salt solution, dried and evaporated in vacuo to a partially crystalline residue which consisted principally of a mixture of cis 5α,6α:17α,20-dioxido-16α-methylpregnan-3β,20-diol diacetate, trans 5α,6α:17α,20-dioxido-16α-methylpregnan-3β,20-diol diacetate and the corresponding 5β,6β-oxido epimers (VIIa–d), $\lambda_{max.}^{CCl_4}$ 5.75, 5.91 μ

EXAMPLE 6

*Alkaline Hydrolysis of the 5,6:17α,20 - Dioxido - 16α-Methylpregnan-3β,20-Diol 3,20-Diacetates (VIIa–d)*

A solution of the mixture of diepoxides (VIIa–d) from Example 5 in 150 ml. of methanol was placed under nitrogen and a solution of 1.0 g. of potassium hydroxide in 50 ml. of methanol was added. The mixture was heated under reflux for 60 minutes, then cooled, 1.0 ml. of glacial acetic acid added and the mixture evaporated in vacuo to dryness. The product was worked up and consisted of a mixture of 5α,6α- and 5β,6β-oxido-16α-methylpregnan-3β,17α-diol-20-one (VIIIa and VIIIb), $\lambda_{max.}^{CCl_4}$ 5.86 and 5.91 μ

EXAMPLE 7

*Acylation of 5α,6α-Oxido-16α - Methylpregnan - 3β,17α-Diol-20-One and Its 5β,6β-Isomer (VIIIa and VIIIb)*

A solution of the mixed oxides (VIIIa and VIIIb) obtained in Example 6 in 20 ml. of pyridine was treated with 3.0 ml. of acetic anhydride for 17 hours at room temperature. Dilution with water caused the separation of a solid which was removed by filtration, washed with water and methanol, and then dried to give 3.36 g. of the mixed 5,6-oxido-16α-methylpregnan-17α-ol-20-one acetates (IXa and IXb), $\lambda_{max.}^{KBr}$ 5.78, 5.90, and 8.03 μ

EXAMPLE 8

*Acid-Catalyzed Hydrolysis of 5α,6α- and 5β,6β-Oxido-16α-Methylpregnan-3β,17α-Diol - 20 - One 3 - Acetate (IXa and IXb)*

The mixed oxide acetates (3.36 g.) (IXa and IXb) of Example 7 were dissolved in 80 ml. of acetone and 20 ml. of 1 N aqueous perchloric acid added. After 30 minutes at room temperature, 500 ml. of water was added and the resulting suspension filtered. The residue was washed with water, 5% aqueous sodium bicarbonate solution, again with water and finally dried to give 2.4 g. of 16α-methyl-3β,5α,6β,17α-tetrol-20-one 3-acetate (X), $\lambda_{max.}^{KBr}$ 5.86, 7.9 μ

EXAMPLE 9

*Reclosure of the Trans 5,6-Diol System of 16α-Methylpregnan-3β,5α,6β,17α-Tetrol-20-One 3-Acetate (X) to the Corresponding 5α,6α-Oxide*

The crude tetrolone acetate (X) (2.4 g.) of Example 8 was dissolved in 25 ml. of pyridine and treated with 2.0 ml. of methanesulfonyl chloride. The mixture was allowed to stand at 6° for 16 hours, then for 6 hours at room temperature after which it was added to a solution of 3.0 g. of sodium hydroxide in 25 ml. of water. The mixture was heated under reflux for 30 minutes, cooled and 4.0 ml. of glacial acetic acid added. Dilution with 250 ml. of water caused a finely divided precipitate to separate, which was removed by filtration, washed with water and dried, wt. 1.6 g. Recrystallization of this material from acetone gave 5α,6α-oxido-16α-methylpregnan-3β,17α-diol-20-one, M.P. 207–212°, infrared spectrum in potassium bromide identical to that of the compound prepared in Example 3.

EXAMPLE 10

*Reduction of 5α,6α-Oxido-16α-Methylpregnan - 3β,17α-Diol-20-One (IV)*

To a solution of 1.09 g. of 5α,6α-oxido-16α-methylpregnan-3β,17α-diol-20-one in 30 ml. of tetrahydrofuran and 10 ml. of water was added 0.160 g. of sodium borohydride. After heating under reflux for 35 minutes, the reaction mixture was cooled and 30 ml. of saturated salt solution added. The organic layer was separated and washed with two portions of saturated salt solution. The organic layer was then slowly diluted with 150 ml. of water. An oil separated which slowly solidified. Filtration gave 5α,6α-oxido - 16α - methylpregnan - 3β,17α,20 (α+β)-triol (XIa and XIb), melting at 207–223°. Several recrystallizations of this material from acetone gave the pure 5α,6α-methylpregnan-3β,17α,20β - triol (XIb), melting at 233–236°, [α]$_D^{31}$ —91.3° (chloroform), $\lambda_{max.}^{KBr}$ 12.54 μ

*Analysis.*—Calcd. for $C_{22}H_{36}O_4$: C, 72.49; H, 9.96. Found: C, 72.48; H, 10.05.

EXAMPLE 11

*Grignard Alkylation of 5α,6α-Oxido-16α-Methylpregnan-3β,17α,20β-Triol (XIb)*

A solution of 3.10 g. of 5α,6α-oxido-16α-methylpregnan-3β,17α,20-triol in 70 ml. of tetrahydrofuran was heated to reflux and 55 ml. of a 3 M solution of methyl magnesium bromide in ether added over a five-minute period. Fifty ml. of toluene was added, 60 ml. was removed by distillation and the remaining mixture heated under reflux for 130 minutes. While cooling, 80 ml. of saturated aqueous ammonium chloride solution was added. The organic layer was separated, washed twice with saturated salt solution, dried and evaporated in vacuo to a crystalline solid, 6β,16α-dimethylpregnan-3β,5α,17α,20 (α+β)-tetrol, M.P. 140–194°. Several recrystallizations of this mixture from ethyl acetate gave 6β,16α - dimethylpregnan - 3β,5α,17α, 20β-tetrol (XII), melting at about 201–205°, [α]$_D^{36}$—32.4° (ethanol).

EXAMPLE 12

*Oxidation of 6β,16α - Dimethylpregnan-3β,5α-17α,20β-Tetrol (XII) With Flavobacterium dehydrogenans*

A culture of *Flavobacterium dehydrogenans* var. *hydrolyticum* (ATCC 13930) was carried on slants of Gumbo agar prepared as follows:

| | |
|---|---:|
| Agar _____g__ | 15.0 |
| Yeast abstract _____g__ | 5.0 |
| Beef extract _____g__ | 5.0 |
| Proteose peptone _____g__ | 5.0 |
| Sodium chloride _____g__ | 5.0 |
| Dextrose _____g__ | 1.0 |
| Distilled water _____ml__ | 1000 |

The pH of the above mixture was adjusted with aqueous sodium hydroxide to pH 6.8.

A series of 500 ml. Erlenmeyer flasks was prepared, each containing 100 ml. of the basal culture medium prepared as follows:

| | |
|---|---:|
| Yeast extract _____g__ | 10.0 |
| Monobasic potassium phosphate (KH$_2$PO$_4$)_g__ | 4.49 |
| Dibasic sodium phosphate (Na$_2$HPO$_4$)____g__ | 8.83 |
| Tap water _____ml__ | 1000 |

The pH was adjusted to 6.8 with aqueous sodium hydroxide.

The flasks containing the basal medium were sterilized and then each flask was inoculated with 1.0 ml. portions of an inoculum prepared by washing a Gumbo agar slant with 10 ml. of sterile distilled water. The inoculated flasks were then incubated for 72 hours at room temperature (70–80° F.) on a platform-type reciprocal shaker under constant illumination. A 545.6 mg. sample of the tetrol (XII) was dissolved in 15 ml. of 95% ethyl alcohol and added to five flasks in the following amounts: 116.4, 116.4, 116.4, 116.4 and 80.0 mg. Three cultures containing a total of 312.8 mg. were incubated under the above conditions for five days and two cultures containing 232.8 mg. for seven days.

The steroidal fermentation products were isolated by extraction with ethyl acetate. The three flasks fermented for 5 days were combined and extracted with three 100 ml. portions of ethyl acetate using small amounts of methanol to effect separation of the layers. The combined solvent layers were washed twice with water, with saturated salt solution, dried and evaporated to dryness in vacuo to give 322.5 mg. of a partly crystalline residue. The two flasks fermented for 7 days were combined and extracted as above to give 265.7 mg. of a similar residue.

The two products were partially purified as follows. The 322.5 mg. sample was treated with ca. 3.0 ml. of carbon tetrachloride. The yellow gummy material dissolved leaving a granular crystalline residue which was removed by filtration, washed once with carbon tetrachloride and dried to give 260.1 mg. of product. This product after drying at 78° in vacuo weighed 230.2 mg. indicating solvation with carbon tetrachloride in the original sample. The 265.7 mg. sample on similar treatment with carbon tetrachloride gave 185.6 mg. of partially purified product which on drying at 78° in vacuo weighed 168.0 mg. Infrared comparisons showed these samples to be substantially identical and to contain substantial quantities of 6β,16α-dimethyl-pregnan-5α,17α-diol-3,20-dione (XIII).

EXAMPLE 13

*Dehydration of 6β,16α - Dimethylpregnan-5α,17α-Diol-3,20-Dione (XIII)*

Samples of the two dried products in Example 12 above, weighing respectively 217.3 mg. and 155.2 mg., were dehydrated. The 217.3 mg. sample was treated with 21.7 ml. of a 0.4% solution of concentrated hydrochloric acid in absolute ethanol under reflux for one-half hour. The mixture was then concentrated in vacuo at 30° to a volume of 2–3 ml., diluted with 10 ml. of water and the organic material extracted with 2 portions of ethyl acetate. The extracts were washed with water and saturated salt solution and evaporated to dryness in vacuo to give 215 mg. of crude 6α,16α-dimethyl-17α-hydroxyprogesterone (XIV).

The 155.2 mg. was treated with 15.5 ml. of the 0.4% hydrochloric acid-ethanol solution exactly as described above. The product weighed 165 mg. Infrared and paper chromatographic analysis indicated the presence of 6α,16α-dimethyl-17α-hydroxy-progesterone in substantially the same amount as in the sample above.

These samples were combined and a 352 mg. sample chromatographed on 35 g. of neutral alumina. The fractions eluted with 10%, 20%, and 50% ether in benzene and with ether were combined to give 6a,16α-dimethyl-17α-hydroxyprogesterone identical by M.P., mixed M.P., infrared, and paper chromatographic comparisons to the material prepared in our co-pending application Serial No. 88,030, filed February 9, 1961.

It is to be understood that the invention is not to be limited to the exact details of operation or the exact compounds shown and described as obvious modifications and equivalents will be apparent to those skilled in the art and the invention is to be limited only by the scope of the appended claims.

The embodiments of the invention in which an exclusive property or privilege is claimed are defined as follows:

1. In a process of preparing 6,16α-dialkyl-17-oxygenated progesterone compounds in which each alkyl group has from 1 to 8 carbon atoms, the sequence of steps comprising
   (A) reducing a 5α,6α-oxido-16α-alkypregnan-3β,17α-diol-20-one in which the alkyl group has from 1 to 8 carbon atoms with an alkali metal borohydride to provide a mixture of the 20α and 20β-epimers of 5α,6α-oxido-16α-alkylpregnan-3β,17α,20-triol,
   (B) separating said 20β-epimer from said 20α-epimer,
   (C) alkylating said 20β-epimer with an alkyl magnesium halide in which the alkyl group has from 1 to 8 carbon atoms,
   (D) microbiologically oxidizing the product of (C) by fermentation with the microorganism *Flavobacterium dehydrogenans* var. *hydrolyticum*, and
   (E) dehydrating the product of (D) to provide 6α,16α-dialkyl-17α-hydroxyprogesterone.

2. In a process of preparing 6α,16α-dialkyl-17-oxygenated progesterones in which each alkyl group has from 1 to 8 carbon atoms the step of reducing a 5α,6α-oxido-16α-alkylpregnan-3β,17α-diol-20-one with an alkali metal borohydride to provide a mixture of the 20α and 20β-epimers of 5α,6α-oxido-16α-alkylpregnan-3β,17α,20-triol.

3. In a process of preparing 6α,16α-dialkyl-17-oxygenated progesterones in which each alkyl group has from 1 to 8 carbon atoms the step of alkylating 5α,6α-oxido-16α-alkylpregnan-3β,17α,20β-triol with an alkyl magnesium halide in which the alkyl group has from 1 to 8 carbon atoms.

4. In a process of preparing 6α,16α-dialkyl-17-oxygenated progesterones in which each alkyl group has from 1 to 8 carbon atoms the step of oxidizing 6β,16α-dialkylpregnan-3β,5α,17α,20β-tetrol by fermentation with the microorganism *Flavobacterium dehydrogenans* var. *hydrolyticum*.

5. In a process of preparing 6α,16α-dialkyl-17-oxygenated progesterones in which each alkyl group has from 1 to 8 carbon atoms the sequence of steps comprising
   (A) alkylating a 5α,6α-oxido-16-pregnen-3β-ol-20-one 3-acylate of a hydrocarbon carboxylic acid having from 1 to 12 carbon atoms with an alkyl magnesium halide in which the alkyl group has from 1 to 8 carbon atoms.
   (B) acylating the product of (A) with a hydrocarbon carboxylic acid acylating agent having from 1 to 12 carbon atoms,
   (C) epoxidizing the acylated product with a peracid to provide a 5α,6α:17α,20-dioxido compound, and
   (D) hydrolyzing said dioxido compound under alkaline conditions to provide 5α,6α-oxido-16α-alkylpregnan-3β,17α-diol-20-one.

6. A steroid compound selected from the group consisting of the cis and trans forms of

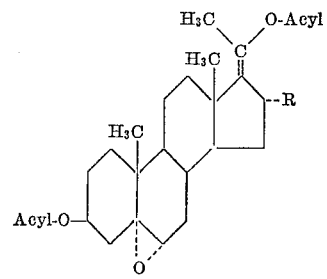

where R is an alkyl group having from 1 to 8 carbon atoms.

7. A steroid compound as defined in claim 6 wherein R is methyl.

8. A steroid compound having the formula

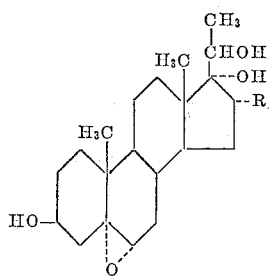

where R is an alkyl group having from 1 to 8 carbon atoms.

9. A steroid compound as defined in claim 8 wherein R is methyl.

10. A steroid compound having the formula

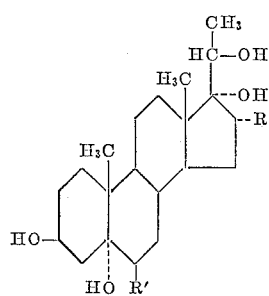

where R and R' are alkyl groups having from 1 to 8 carbon atoms.

11. A steroid compound as defined in claim 10 wherein R is methyl.

12. A steroid compound as defined in claim 10 wherein R' is methyl.

13. 6$\beta$,16$\alpha$-dimethylpregnan-3$\beta$,5$\alpha$,17$\alpha$,20$\beta$-tetrol.

References Cited in the file of this patent

UNITED STATES PATENTS

| | | |
|---|---|---|
| 2,996,502 | Ruggieri et al. | Aug. 15, 1961 |
| 3,019,219 | Cantrall et al. | Jan. 30, 1962 |
| 3,040,035 | Petrow et al. | June 19, 1962 |

OTHER REFERENCES

Babcock et al.: J.A.C.S. 80, 2904–2905 (1958).
Bernstein et al.: J. Org. Chem., 26, 269–271 (January 1961).

UNITED STATES PATENT OFFICE
CERTIFICATE OF CORRECTION

Patent No. 3,123,600                  March 3, 1964

Robert P. Graber et al.

It is hereby certified that error appears in the above numbered patent requiring correction and that the said Letters Patent should read as corrected below.

Column 3, formula (V), the upper right-hand portion of the formula should appear as shown below instead of as in the patent:

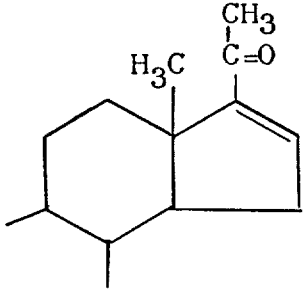

columns 3 and 4, formula (VIIa), the lower left-hand portion of the formula should appear as shown below instead of as in the patent:

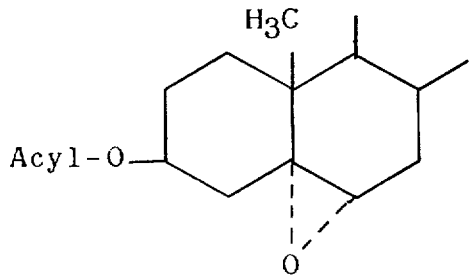

column 5, line 48, for "3α,20-" read -- 3β,20- --; line 56, for "-15,17" read -- -5,17 --; column 6, lines 64 to 75, the upper right-hand portion of the formula should apper as shown below instead of as in the patent:

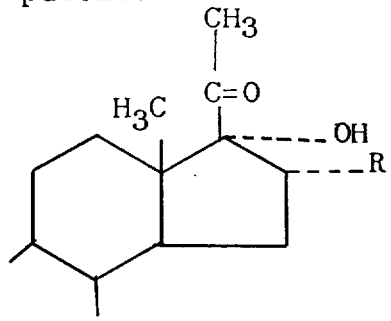

column 14, line 47, for "198-2020" read -- 198-202° --;
column 15, line 4, for "an8.46µd" read -- and 8.46µ --.

Signed and sealed this 3rd day of November 1964.

(SEAL)
Attest:

ERNEST W. SWIDER
Attesting Officer

EDWARD J. BRENNER
Commissioner of Patents